US007339705B2

(12) United States Patent
Kiyohara

(10) Patent No.: US 7,339,705 B2
(45) Date of Patent: Mar. 4, 2008

(54) APPARATUS FOR AND METHOD OF MAKING MEASUREMENT ON PRINTED SHEET

(75) Inventor: Satoru Kiyohara, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 946 days.

(21) Appl. No.: 10/611,061

(22) Filed: Jul. 2, 2003

(65) Prior Publication Data

US 2004/0008358 A1 Jan. 15, 2004

(30) Foreign Application Priority Data

Jul. 15, 2002 (JP) ........................... P2002-205117
Jul. 15, 2002 (JP) ........................... P2002-205118

(51) Int. Cl.
*G06K 15/02* (2006.01)
*H06F 15/00* (2006.01)
*H04N 1/60* (2006.01)

(52) U.S. Cl. ........................ 358/1.9; 358/515; 358/518

(58) Field of Classification Search ................ 358/504, 358/1.15, 461, 1.9, 515, 518; 359/109; 101/211, 101/365, 366; 364/526, 151; 347/6; 396/2; 714/718; 400/621; 348/184, 708
See application file for complete search history.

(56) References Cited

U.S. PATENT DOCUMENTS 5,506,946 A * 4/1996 Bar et al. .................... 345/600
5,754,222 A * 5/1998 Daly et al. .................. 348/184
5,903,712 A * 5/1999 Wang et al. ................. 358/1.9
6,024,018 A 2/2000 Darel et al.
6,382,101 B1 5/2002 Richards
7,027,172 B1 * 4/2006 Parulski et al. ............ 358/1.15
2001/0000222 A1 * 4/2001 Miyazaki et al. ........... 400/621
2004/0170415 A1 * 9/2004 Maeda et al. .................. 396/2

FOREIGN PATENT DOCUMENTS

| | | |
|---|---|---|
| DE | 199 40 879 | 3/2001 |
| EP | 0 798 117 | 10/1997 |
| JP | 04-303660 | 10/1992 |
| JP | 08-261829 | 10/1996 |
| JP | 10-305562 | 11/1998 |
| JP | P2001-353852 | 12/2001 |

* cited by examiner

*Primary Examiner*—King Y. Poon
*Assistant Examiner*—Allen Nguyen
(74) *Attorney, Agent, or Firm*—McDermott Will & Emery LLP

(57) ABSTRACT

A printed sheet measurement apparatus initially captures images on a reference sheet and a printed sheet to store respective image data. Next, both of the image data are displayed on a display element, and a pair of corresponding points are specified for each of the image data. A judgment is made as to whether or not the pair of corresponding points on each of the images are spaced at least a predetermined distance apart from each other. If not, the corresponding points are specified again. After the corresponding points are determined, the coordinates of the corresponding points are stored. The coordinates of an objective point at which a colorimetric value is to be computed is computed based on the corresponding points. Next, a colorimetric value on the coordinates is measured. Thus, the printed sheet measurement apparatus measures the colorimetric values in precisely corresponding positions on the respective images if there is a difference in coordinate relationship between the reference sheet and the printed sheet.

20 Claims, 7 Drawing Sheets

APPARATUS FOR AND METHOD OF MAKING MEASUREMENT ON PRINTED SHEET

BACKGROUND OF THE INVENTION

1. Field of the Invention

The present invention relates to a printed sheet measurement apparatus for measuring a colorimetric value and the like on a printed sheet based on image data obtained by capturing an image on the printed sheet to effect color control of printed sheets.

2. Description of the Background Art

Conventionally, a printed sheet measurement apparatus has been known in the art which captures an image on a printed sheet placed on a table to measure a colorimetric value in any position on the printed sheet based on the resultant image data. Such a printed sheet measurement apparatus measures the colorimetric value in a predetermined position on a printed sheet sampled from a printing machine to control the amount of ink supply in the printing machine in accordance with a result of comparison between the measured colorimetric value and a colorimetric value in its corresponding position included in preset reference image data. It is contemplated that the reference image data is obtained, for example, by capturing an image on a previously prepared reference printed sheet (which is a printed sheet or a printed sample produced by proof printing and referred to hereinafter as a reference sheet).

Measuring the colorimetric value (or color density), as that term is used herein, refers to converting a color on the printed sheet into a numerical form represented in a predetermined color system. As an example, the term refers to determining a density value corresponding to each color of YMCK or RGB and a numerical value represented in a known color system such as L*a*b* color system.

However, the reference sheet is not always in the same coordinate relationship with the sampled printed sheet. Specifically, there is a difference, in some cases, in size, position or appearance between the reference sheet and the sampled printed sheet.

The difference in size between the reference sheet and the sampled printed sheet arises, for example, when the previously prepared reference sheet is used in a prior print job and the print size is scaled in the current print job or when the proof printing is performed on the reference sheet different in size from the sampled printed sheet because of the limited size supported by an apparatus itself for performing the proof printing. Further, there are cases where the printed sheets themselves have slightly different sizes.

The difference in position between the reference sheet and the sampled printed sheet arises, for example, when misregistration occurs during the image capture by the printed sheet measurement apparatus.

The difference in appearance between the reference sheet and the sampled printed sheet arises, for example, when the sampled printed sheet is subjected to imposition. In the printing process for a book or the like, a sheet including a plurality of imposed pages is printed, and is then subjected to a predetermined folding process and a bookbinding process. Thus, the sampled printed sheet includes the plurality of imposed pages. Since the plurality of imposed pages are arranged depending on how to fold the sheet or so as to properly form a signature, the plurality of pages are not arranged in consecutive order, and some of the individual pages are inverted. However, a proof sheet obtained when a printed sample is produced sometimes consists of a single page or a pair of pages which become facing pages after bookbinding because of the limited output size of a proof system. In other cases, a printed sample is prepared and presented by a client.

The above-mentioned difference in coordinate relationship between the reference sheet serving as a color matching reference and the actual printed sheet brings about nonequivalent corresponding positions on the image data about the reference sheet and the actual printed sheet which are produced by the printed sheet measurement apparatus. Therefore, the background art printed sheet measurement apparatus might give rise to nonequivalent positions of measurement of the colorimetric values to be compared with each other, thereby to fail to precisely effect the color control of the printed sheets.

SUMMARY OF THE INVENTION

The present invention is intended for a printed sheet measurement apparatus for acquiring image data by capturing an image on a printed sheet sampled from a printing apparatus to compute a colorimetric value on the printed sheet based on the image data for ink control in the printing apparatus.

According to the present invention, the printed sheet measurement apparatus comprises: a storing element for storing first image data obtained by capturing the image on the printed sheet, and second image data obtained based on reference image data related to an image on a reference printed sheet; a display element for displaying the first image data and the second image data; a specifying element for specifying a pair of corresponding points for each of the first and second image data displayed on the display element; a coordinate computing element for associating the first and second image data with each other based on the corresponding points to compute a pair of coordinates of a first objective point for one of the first and second image data corresponding to a pair of coordinates of a second objective point for the other of the first and second image data; and a colorimetric value computing element for computing a colorimetric value at each of the first and second objective points corresponding to each other, based on pixel values at the first and second objective points for the first and second image data.

If the reference printed sheet differs in size from the actual printed sheet, the printed sheet measurement apparatus precisely establishes the objective points in equivalent positions to effect precise color control of printed sheets.

Preferably, the printed sheet includes a set of copies of the reference image data, and the printed sheet measurement apparatus further comprises an image combining element for placing and combining the copies of the reference image data so as to correspond to the first image data to generate the second image data.

If the reference printed sheet is provided for each unit image constituting the appearance of the actual printed sheet, the printed sheet measurement apparatus easily makes a color density comparison.

The present invention is also intended for a method of making a measurement on a printed sheet.

According to the present invention, the method comprises the steps of: a) storing first image data obtained by capturing an image on a printed sheet sampled from a printing apparatus, and second image data obtained based on reference image data related to an image on a reference printed sheet; b) displaying the first image data and the second image data; c) specifying a pair of corresponding points for each of the first and second image data displayed in the step b); d) associating the first and second image data with each other based on the corresponding points to compute a pair of coordinates of a first objective point for one of the first and second image data corresponding to a pair of coordinates of a second objective point for the other of the first and second image data; and e) computing a colorimetric value at each of the first and second objective points corresponding to each other to be used for ink control in the printing apparatus, based on pixel values at the first and second objective points for the first and second image data.

If the reference printed sheet differs in size from the actual printed sheet, the method precisely establishes the objective points in equivalent positions to effect precise color control of printed sheets.

Preferably, the printed sheet includes a set of copies of the reference image data, and the method further comprises the step of f) placing and combining the copies of the reference image data so as to correspond to the first image data to generate the second image data.

If the reference printed sheet is provided for each unit image constituting the appearance of the actual printed sheet, the method easily makes a color density comparison.

It is therefore an object of the present invention to provide a printed sheet measurement apparatus capable of making a precise colorimetric value comparison if there is a difference in coordinate relationship between a reference sheet and a sampled printed sheet, thereby to effect proper color control of printed sheets.

These and other objects, features, aspects and advantages of the present invention will become more apparent from the following detailed description of the present invention when taken in conjunction with the accompanying drawings.

DESCRIPTION OF THE PREFERRED EMBODIMENTS

Apparatus Construction

Figure 1:
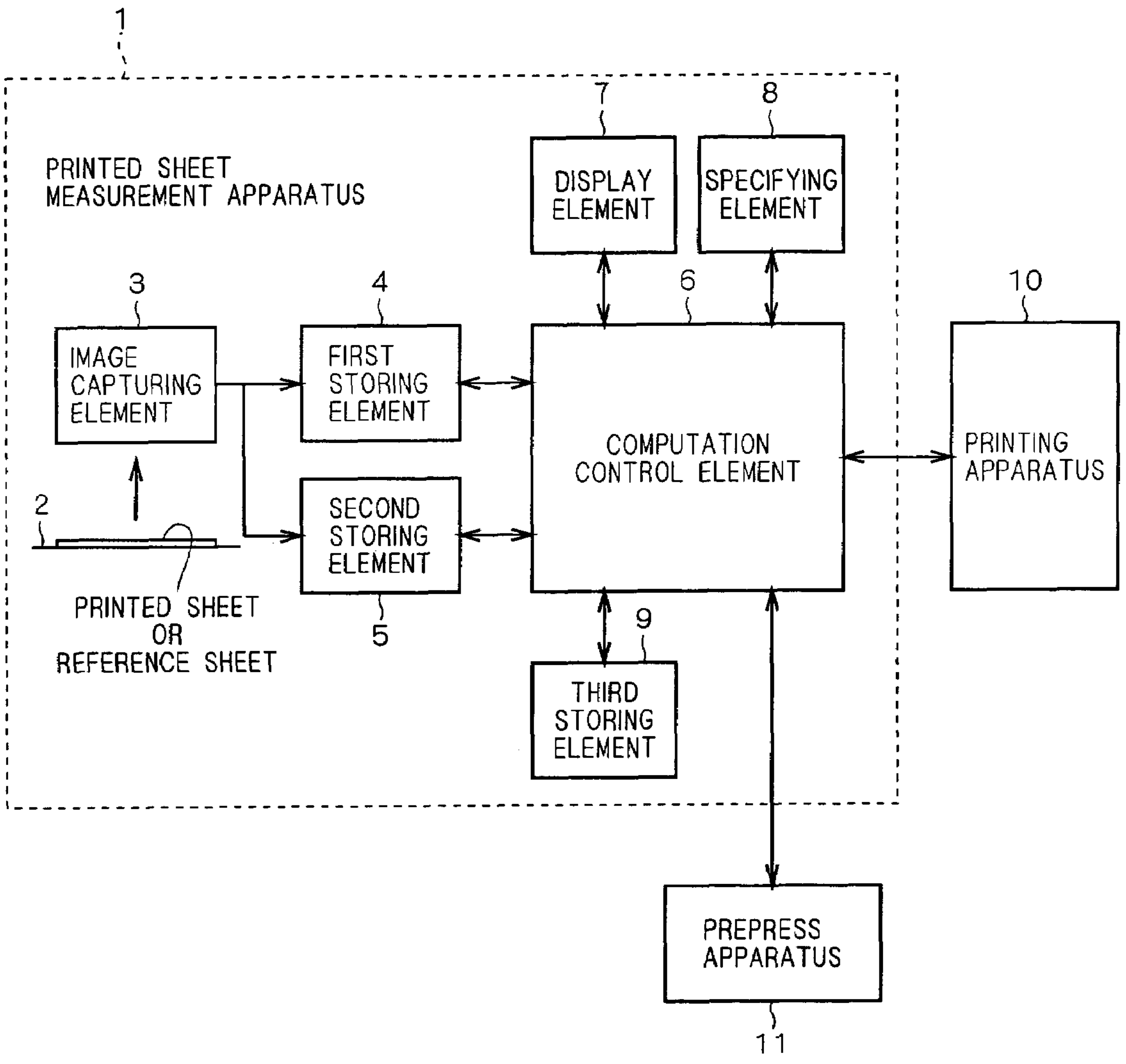
FIG. 1 is a block diagram of an example of a printed sheet measurement apparatus according to the present invention.

An example of a printed sheet measurement apparatus according to the present invention will now be described with reference to the drawings. FIG. 1 is a block diagram of the printed sheet measurement apparatus.

The printed sheet measurement apparatus 1 captures an image on a printed sheet sampled from a printing apparatus 10 to acquire image data, thereby computing a colorimetric value on the printed sheet, based on the image data for purposes of ink control in the printing apparatus 10. The printed sheet measurement apparatus 1 comprises: an image capturing element 3 for capturing an image on a printed sheet (including a sampled printed sheet and a reference sheet) placed on a table 2; first and second storing elements 4 and 5 for storing therein image data acquired by the image capturing element 3; a computation control element 6 for performing computation based on the image data; a display element 7 for displaying the image data; a specifying element 8 for specifying a position on an image on the display element 7; and a third storing element 9 for storing a computation result and the like. The printed sheet measurement apparatus 1 is connected to the printing apparatus 10 and a prepress apparatus 11 so as to be capable of data communication.

The table 2 is a flatbed table capable of placing a printed sheet thereon. Preferably, the table 2 includes a vacuum-holding element and the like provided on the surface thereof for smoothly supporting the printed sheet.

The image capturing element 3 includes a two-dimensional CCD camera and the like placed on the table 2, and captures an image on the printed sheet placed on the table 2 and illuminated by a light source element not shown to perform photoelectric conversion into image data. The image capturing element 3 may include a one-dimensional line sensor movable relative to the table 2 to scan the printed sheet for image capturing.

The image data acquired by the image capturing element 3 is stored in the first storing element 4 or the second storing element 5. Each of the first and second storing elements 4 and 5 includes a memory element having a RAM. For ease of understanding, it is assumed herein that the first storing element 4 stores image data (referred to hereinafter as first image data) acquired by capturing an image on a printed sheet sampled from the printing apparatus, and the second storing element 5 stores image data (referred to hereinafter as reference image data) acquired by capturing an image on a previously prepared reference sheet. Of course, the first image data and the reference image data may be stored in parallel in different memory areas of the same memory element.

The computation control element 6 performs image processing on the first image data and second image data obtained based on the reference image data to compute a colorimetric value in any position on each of the first and second image data. The computation control element 6 includes a microprocessor having a computing capability. The computation control element 6 functions as a coordinate computing element for computing coordinates in Step S7 to be described later, a colorimetric value computing element for computing a colorimetric value in Steps S8 and S14 to be described later, and an image combining element for placing and combining copies of the reference image data or imposing and combining a plurality of reference image data together in Step S13 to be described later.

The display element 7 includes a CRT or a liquid crystal panel capable of displaying image data. The display element 7 can selectively or simultaneously display the first image data, the second image data and the reference image data. The specifying element 8 includes a known mouse, keyboard or pen tablet. The specifying element 8 can specify the given position on the image displayed on the display element 7 and place the reference image data displayed on the display element 7 in a predetermined layout position. The display element 7 and the specifying element 8 may be integrated together, for example, by the use of a liquid crystal display element having a touch panel capability.

The third storing element 9 is similar in including a RAM to the first and second storing elements 4 and 5, and is used for storage of a measurement result and the like. The third storing element 9 may be constructed by the same memory element as the first and second storing elements as described above.

The printing apparatus 10 performs printing to output the above-mentioned printed sheet to be sampled. An example of the printing apparatus 10 is an offset printing apparatus capable of adjusting a printing density for each YMCK color. Such a known offset printing apparatus comprises an ink amount adjustment mechanism such as an ink duct (or ink fountain) device. The printed sheet measurement apparatus 1 makes a comparison between the first image data about the sampled printed sheet and the second image data obtained based on the reference image data to transmit the result of comparison or an ink adjustment amount derived from the result of comparison to the printing apparatus 10. The printing apparatus 10 in turn makes a color adjustment in accordance with the result of comparison or the ink adjustment amount transmitted from the printed sheet measurement apparatus 1.

Examples of the prepress apparatus 11 include a printing plate recording apparatus for producing a printing plate for use in the printing apparatus 10, and an image data generating apparatus for generating image data such as page data constituting an image on a printing plate prior to the production of the printing plate. The image data based on prepress data used in production of the printing plate may be brought as an alternative to the reference image data from the prepress apparatus 111 to the printed sheet measurement apparatus 1. If no reference sheets are provided, the printed sheet measurement apparatus 1 may use the image data obtained from the prepress apparatus 11, e.g. CIP3-standard PPF data. The printing apparatus 10 and the prepress apparatus 11 may be constructed as a printing apparatus with prepress mechanism which has the integrated capabilities thereof.

First Preferred Embodiment

A first preferred embodiment according to the present invention will now be described.

In the first preferred embodiment, the appearance of the sampled printed sheet involves no imposition. The reference image data stored in the second storing element 5 is used as the second image data serving as a colorimetric value reference in the first preferred embodiment.

A procedure of operation of the printed sheet measurement apparatus 1 according to the first preferred embodiment will be described with reference to the flowchart of FIG. 2. FIGS. 3A and 3B are views for illustrating examples of images on the reference sheet and the sampled printed sheet, and will be referred to whenever necessary in the description.

Figure 2:
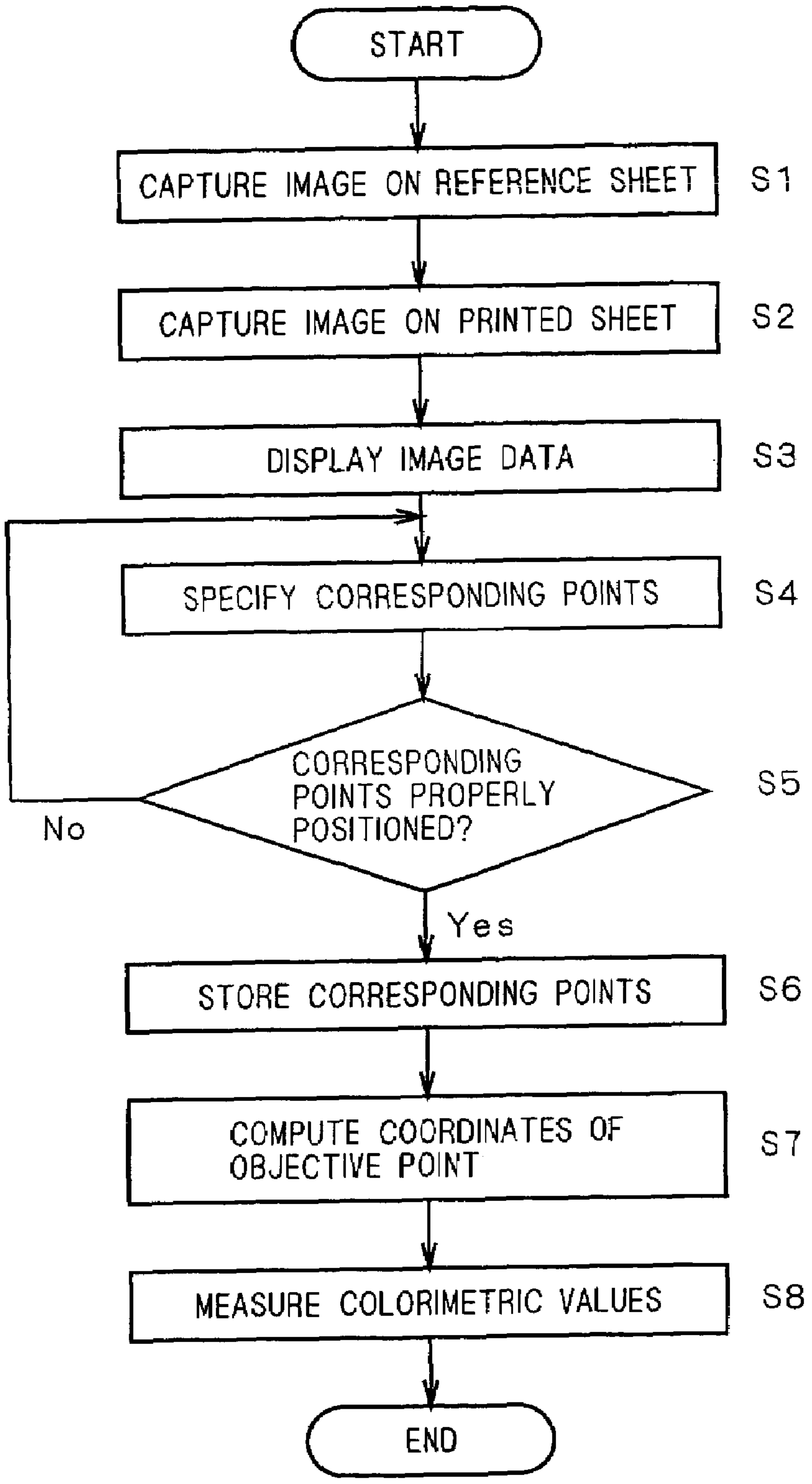
FIG. 2 is a flowchart showing a procedure of operation according to a first preferred embodiment of the present invention.
Figure 3B:
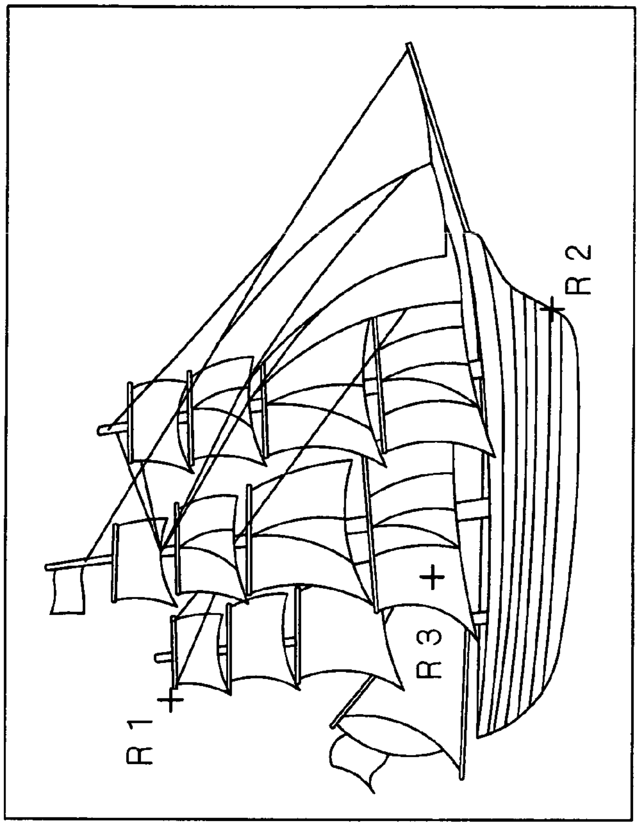
FIGS. 3A and 3B are views for illustrating corresponding points on first and second image data.
Figure 3A:
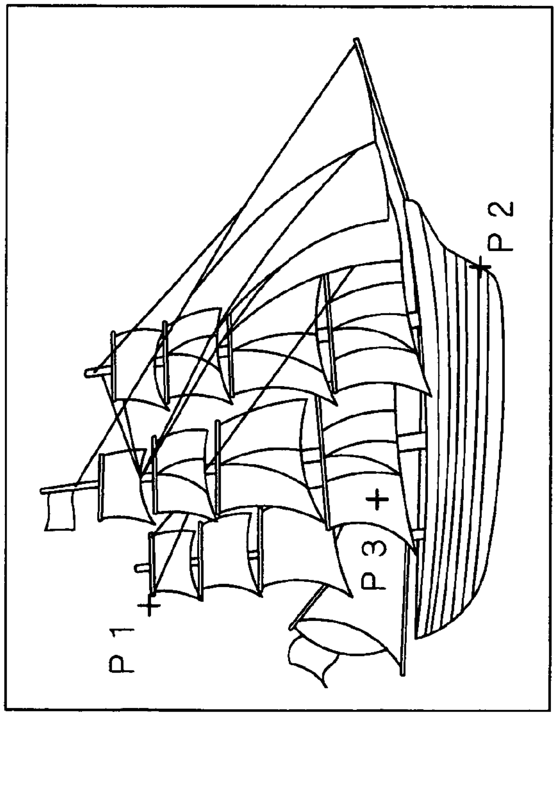

Referring to FIG. 2, the printed sheet measurement apparatus 1 captures an image on the reference sheet to store the second image data in the second storing element 5 in Step S1. An example of the image data about the reference sheet is shown in FIG. 3A. Image data obtained from the prepress apparatus 11 may be used in place of the image data obtained by capturing the image on the reference sheet.

Next, in Step S2, the printed sheet measurement apparatus 1 captures an image on the sampled printed sheet in a similar manner to store the first image data in the first storing element 4. An example of the image data about the sampled printed sheet is shown in FIG. 3B. In this case shown in FIGS. 3A and 3B, the reference sheet is smaller in size than the sampled printed sheet.

In Step S3, the first and second image data thus obtained are displayed on the display element 7. Display is preferably presented in such a manner that the first and second image data suitably scaled down are displayed side by side on the same screen. Alternatively, the first and second image data may be selectively displayed in succession.

In Step S4, an operator specifies a pair of corresponding points on each of the displayed images by the use of the specifying element 8. For example, the operator specifies the pair of corresponding points P1 and P2 on the second image data as shown in FIG. 3A, and the pair of corresponding points R1 and R2 on the first image data as shown in FIG. 3B which are in positions relatively equivalent on a picture to the pair of corresponding points P1 and P2, respectively. A characteristic portion on the image, e.g. a tip of a mast in the example of the picture shown in FIGS. 3A and 3B, is easy to specify.

Each pair of corresponding points P1, P2 and R1, R2 are preferably diagonally spaced at least a predetermined distance apart from each other on the corresponding image, and more particularly are placed near two opposed corners of the image. This is intended to reduce computation error in a coordinate computation to be described later.

The corresponding points P1, P2, R1, R2 may be specified in any specific order. If the distance between the pair of corresponding points P1 and P2 (and the distance between the pair of corresponding points R1 and R2) is less than the predetermined distance, it is judged that a specification error occurs in Step S5, and Step S4 is executed again. The judgment about the distance between the pair of corresponding points P1 and P2 (and the distance between the pair of corresponding points R1 and R2) is preferably made by judging whether each of an X coordinate difference and a Y coordinate difference between the first image data and the second image data is not less than a predetermined value.

Although it is judged that the specification error occurs in Step S5 if the pair of corresponding points are not spaced at least the predetermined distance apart from each other in the above description, other techniques may be employed. For example, after a first point is specified, a range indication may be presented so that an area in which a second point is to be specified is previously established at a distance equal to or greater than the predetermined distance from the first point. Of course, another range indication may be presented on the image so as to allow the operator to selectively specify the first and second points within a preset predetermined range.

In Step S6, after the four corresponding points are determined, the coordinates of the four corresponding points on the image data are stored in the third storing element 9.

In Step S7, the coordinates of an objective point on the first image data at which the colorimetric value is to be computed are computed. Objective points are in positions important for color adjustment on the printed sheet, and the objective point on the second image data is previously specified by an operator. It is assumed that, for example, the objective point P3 is specified on the second image data shown in FIG. 3A. Coordinate data about the objective point R3 on the first image data corresponding to the objective point P3 are computed based on the coordinates of the four corresponding points in a manner to be described below.

The coordinates (r3x, r3y) of the objective point R3 are calculated as:

$$r3x=(p3x-p1x)(r2x-r1x)/(p2x-p1x)+r1x$$

$$r3y=(p3y-p1y)(r2y-r1y)/(p2y-p1y)+r1y$$

where p1x and ply are the X and Y coordinates of the corresponding point P1 on the image data, p2x and p2y are the X and Y coordinates of the corresponding point P2, r1x and r1y are the X and Y coordinates of the corresponding point R1, r2x and r2y are the X and Y coordinates of the corresponding point R2, and p3x and p3y are the X and Y coordinates of the objective point P3.

The above-mentioned coordinate computation means to associate the first and second image data with each other based on the corresponding points P1, P2, R1, and R2, and to calculate the coordinates (r3x, r3y) on one of the image data (in this case, the first image data) corresponding to the predetermined coordinates (p3x, p3y) on the other image data (in this case, the second image data). The above-mentioned coordinate computation allows the relative coordinate positions of the objective points P3 and R3 on the first and second image data to be equivalent to each other if there is a difference in size between the sampled printed sheet and the reference sheet.

In Step S8, the colorimetric values at the respective objective points (or the coordinate positions) are computed based on pixel values in the image data on the coordinates of the objective points P3 and R4. A comparison is made between the colorimetric values, and the ink adjustment amount for the printing apparatus 10 is computed so that the colorimetric value on the sampled printed sheet approaches that on the reference sheet. Not less than one pair of objective points P3 and R3 may be specified. For example, the pair of objective points may be specified for each of the regions defined by ink duct keys of the printing apparatus 10. This allows the adjustment of the ink amount for each of the regions defined by the ink duct keys. The printed sheet measurement apparatus 1 may perform only the computation or comparison operation of the colorimetric values whereas the printing apparatus 10 performs the computation of the ink adjustment amount based on the colorimetric values.

Although the operator manually specifies the corresponding points in the first preferred embodiment, the corresponding points may be automatically specified. An example of the automatic specification is to automatically extract the corresponding points from the picture in accordance with preset conditions by using various pattern recognition and edge detection techniques. One of the simplest technique thereof includes extracting a particular pattern, e.g. a character and linework graphics, from a linework part on the image to establish a corresponding point in a position in which the particular pattern is present. Alternatively, a register mark previously put on the image may be used as the particular pattern, or a corner point or vertex of a rectangular image may be used as the corresponding point. Thus automatically specifying the corresponding points reduces the burdens of operation on the operator and eliminates individual variations in specified corresponding points.

Second Preferred Embodiment

Next, a second preferred embodiment according to the present invention will be described.

In the second preferred embodiment, the appearance of the sampled printed sheet includes a set of copies of the reference image, and involves step-and-repeat imposition. The computation control element 6 according to the second preferred embodiment performs the step-and-repeat imposition on the reference image data stored in the second storing element 5 to generate new image data which in turn is used as the second image data. The third storing element 9 according to the second preferred embodiment is also used for storage of the generated second image data.

A procedure of operation of the printed sheet measurement apparatus 1 according to the second preferred embodiment will be described with reference to the flowchart of FIG. 4. FIGS. 5A and 5B are views for illustrating examples of images on the reference sheet and the sampled printed sheet, and will be referred to whenever necessary in the description.

Figure 4:
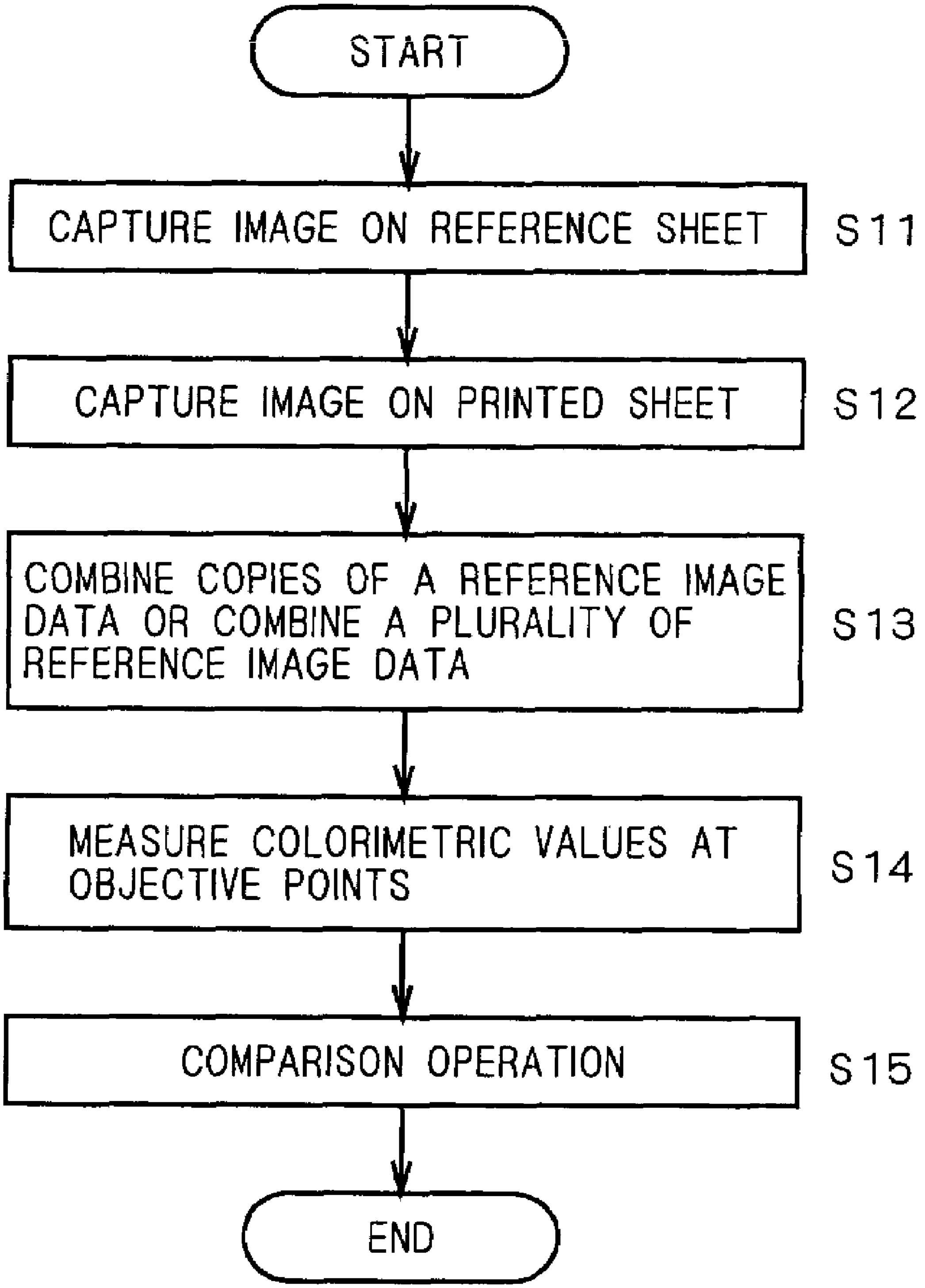
FIG. 4 is a flowchart showing a procedure of operation according to second and third preferred embodiments of the present invention.
Figure 5B:
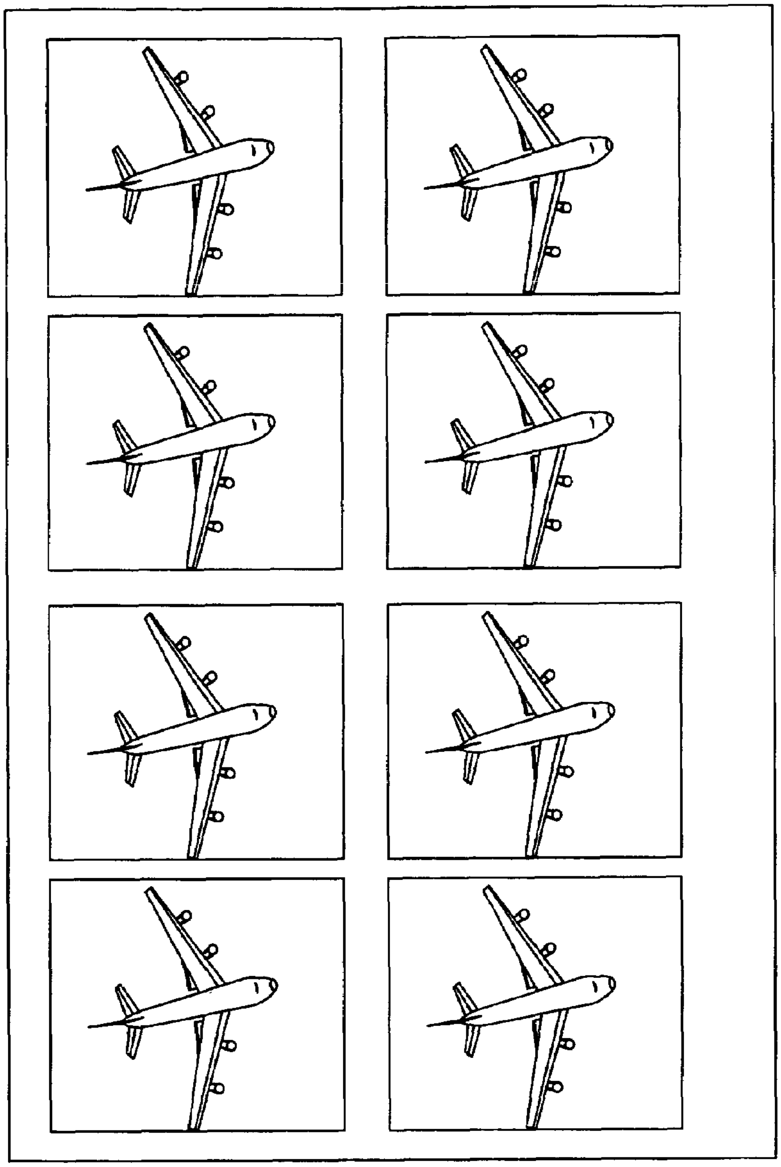
FIGS. 5A and 5B are views for illustrating examples of images on a reference sheet and a sampled printed sheet according to the second preferred embodiment.
Figure 5A:
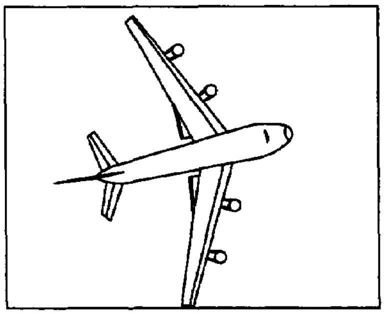

Referring to FIG. 4, the printed sheet measurement apparatus 1 captures an image on the reference sheet to store the reference image data in the second storing element 5 in Step S11. An example of the reference image data is shown in FIG. 5A. Image data obtained from the prepress apparatus 11 may be used in place of the image data obtained by capturing the image on the reference sheet.

Next, in Step S12, the printed sheet measurement apparatus 1 captures an image on the sampled printed sheet in a similar manner to store the first image data in the first storing element 4. An example of the image data about the sampled printed sheet is shown in FIG. 5B. In this case shown in FIGS. 5A and 5B, eight copies of the reference image such as that on the reference sheet are imposed by the step-and-repeat imposition.

In Step S13, the reference image data obtained by capturing the image on the reference sheet is expanded so as to correspond to the first image data by placing and combining copies of the reference image data. In this case, the reference image data is pasted (or subjected to the step-and-repeat process) repeatedly a plurality of times in a base frame equal in size to the printed sheet in accordance with a preset step-and-repeat layout. Space between the copies of the reference image data is filled with blank data. If peripheral portions (blank portions) of the copies of the reference image data overlap, the overlap is removed. The operator may produce the step-and-repeat layout by specifying imposition conditions including the number of copies to be imposed and the amount of space (known as center margin or gutter space) between the copies by means of the specifying element. Alternatively, layout data may be obtained from the prepress apparatus 11 or the like. The image combination in Step S13 provides the second image data having the same appearance and size as the first image data.

In step S14, colorimetric values are measured in a desired position on the first image data and in its corresponding position on the second image data. Such a technique for computing actual colorimetric values based on the image data is known, for example, as a technique for converting the RGB values of a pixel in the corresponding position into YMCK values or L*a*b* values, and will not be described in detail.

The measurement may be made within a predetermined area. For instance, average colorimetric values on the respective first and second image data may be determined and compared with each other for each of the regions corresponding to the ink duct key regions of the printing apparatus 10.

In Step S15, the measured colorimetric values are subjected to a comparison operation, and the ink adjustment amount is computed based on the result of comparison. For example, it is a known technique to determine a difference between the two measured colorimetric values to convert each ink key opening of the ink duct device into an opening adjustment amount to be controlled in accordance with the difference. The printed sheet measurement apparatus 1 may perform the steps until the comparison operation of the colorimetric values whereas the printing apparatus 10 performs the computation of the ink adjustment amount corresponding to the each ink key opening of the ink duct device.

The above-mentioned operation according to the second preferred embodiment provides the second image data having imposed copies similar to those on the actual printed sheet even if a single image is printed on the reference sheet. This makes the first image data about the printed sheet and the second image data based on the reference sheet the same in size and in appearance, thereby facilitating the color measurement in any position on the first and second image data and the color comparison in any position between the first and second image data.

Figure 7:
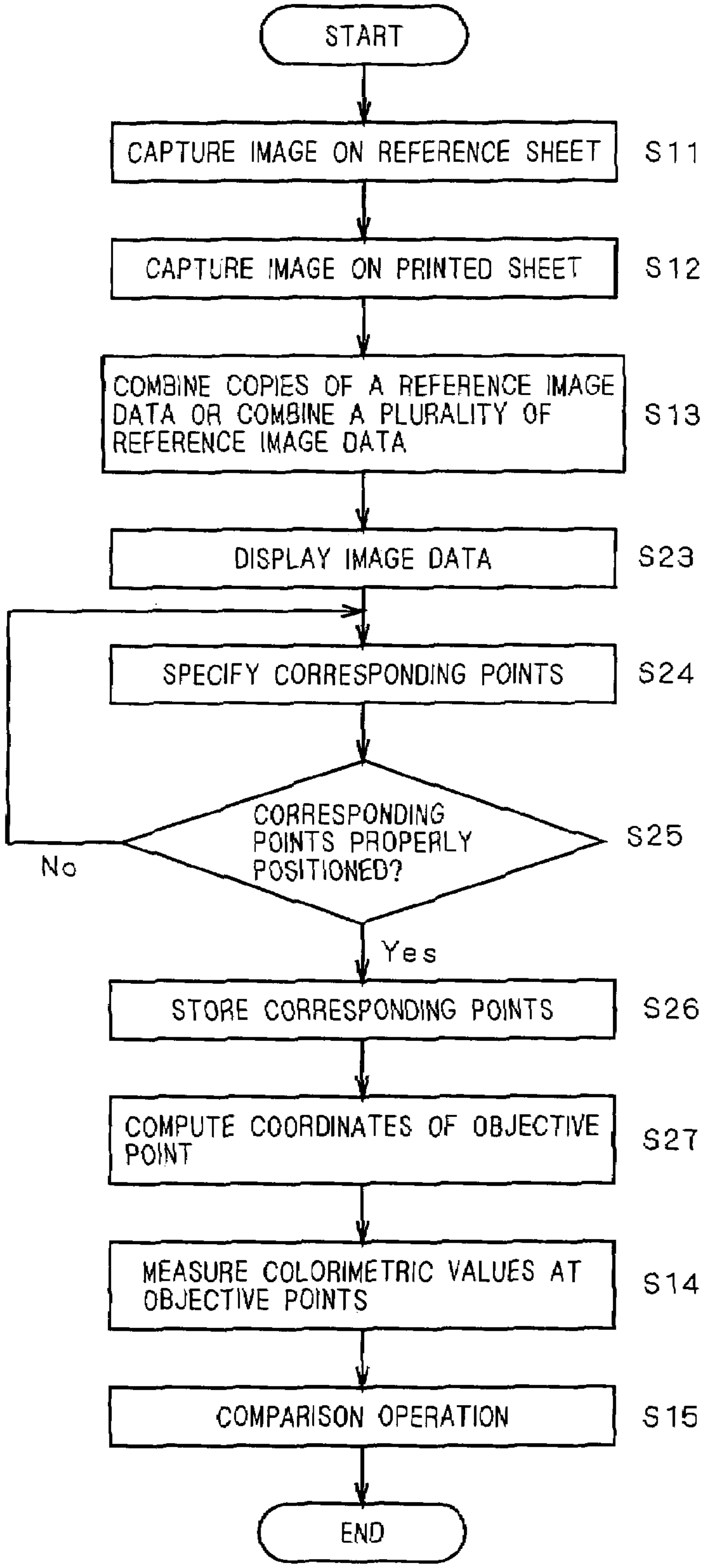
FIG. 7 is a flowchart showing another procedure of operation according to the second and third preferred embodiments.

Referring to FIG. 7, the method of making a measurement on the printed sheet according to the second preferred embodiment may further comprise Steps S23 to S27 similar to Steps S3 to S7 of the first preferred embodiment, Steps S23 to S27 being performed after Step S13 and before Step S14, thereby to determine the positions (objective points) at which the colorimetric values are measured in Step S14. This achieves proper color control of the printed sheets if the reference image (unit image) on the sampled printed sheet differs in size from the reference image data obtained from the reference sheet or if the first image data differs in position from the second image data.

Third Preferred Embodiment

Next, a third preferred embodiment according to the present invention will be described.

In the third preferred embodiment, the appearance of the sampled printed sheet includes a set of different reference images, and involves the imposition of the different reference images, e.g. page data constituting a book. The computation control element 6 according to the third preferred embodiment combines a plurality of different reference image data stored in the second storing element 5 together in accordance with a predetermined layout to generate new image data which in turn is used as the second image data. The third storing element 9 according to the third preferred embodiment is also used for storage of the generated second image data.

A procedure of operation of the printed sheet measurement apparatus 1 according to the third preferred embodiment will be described with reference to the flowchart of FIG. 4. The description will be concentrated on differences in procedure of operation between the second and third preferred embodiments, and the same steps as in the second preferred embodiment will not be described.

Figure 6A:
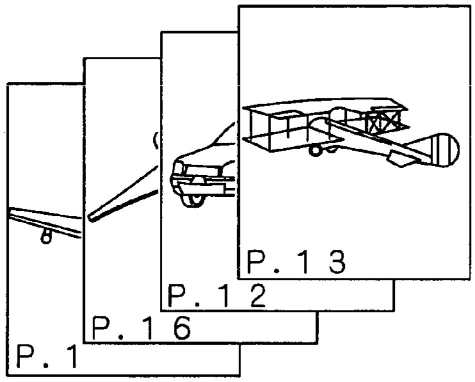
FIGS. 6A, 6B and 6C are views for illustrating examples of images on a proof sheet and a sampled printed sheet according to the third preferred embodiment.
Figure 6B:
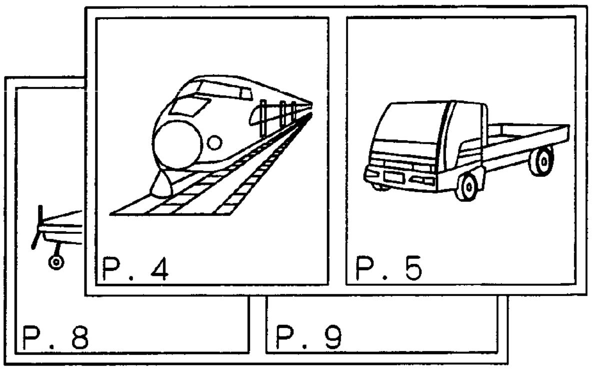
Figure 6C:
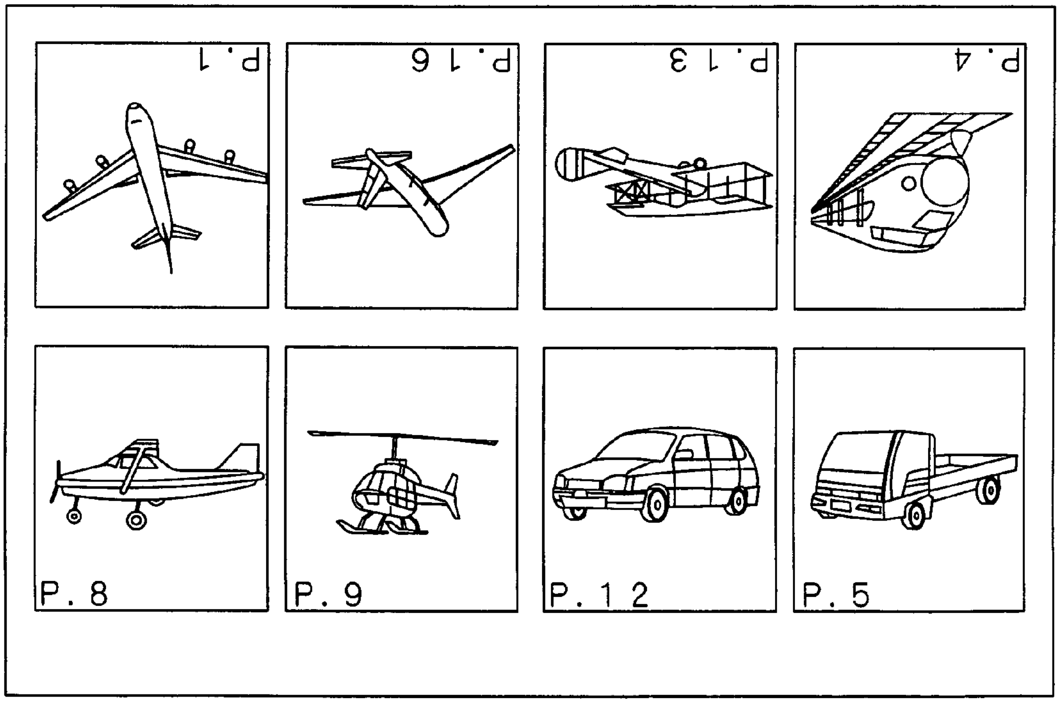

FIG. 6C is a view for illustrating an example of the printed sheet with eight pages of images imposed. As shown in FIG. 6C, the eight pages of the actual printed sheet are arranged and oriented so as to properly form a signature.

FIGS. 6A and 6B are views for illustrating examples of proof sheets (reference sheets) for the printed sheet of FIG. 6C. In this case, each reference sheet shown in FIG. 6A includes a single page 1, 12, 13 and 16 whereas each reference sheet shown in FIG. 6B includes a pair of pages 8 and 9, and 4 and 5 which become facing pages after bookbinding. Of course, such an arrangement is given as an example, but a variety of other forms may be used.

In the case of the above-mentioned printed sheet, a plurality of reference image data are first obtained by successively capturing images on the reference sheets of FIG. 6A and the reference sheets of FIG. 6B in Step S11 in the flowchart of FIG. 4.

Next, for combination of the plurality of reference image data in Step S13, reference image data for each page is separately extracted when a reference sheet includes a plurality of pages imposed as shown in FIG. 6B. The extraction may be carried out by dividing corresponding reference image data into a plurality of reference image data, for example, in accordance with register marks (not shown) put on the respective pages. This process need not be performed when a reference sheet includes a single page as shown in FIG. 6A.

After the reference image data about each page is prepared for all of the pages, the plurality of reference image data are imposed and combined in accordance with a predetermined layout under preset imposition conditions. The imposition process may be performed by an operator manually specifying the arrangement or by automatically imposing the plurality of reference image data based on page data numbers previously assigned to the respective reference image data.

This provides the second image data including the plurality of reference image data imposed in the same pattern as on the printed sheet shown in FIG. 6C. The process steps subsequent to the combination of the plurality of reference image data into the second image data are similar to those of the second preferred embodiment.

The third preferred embodiment also produces the second image data subjected to the imposition in the same pattern as on the actual printed sheet. This makes the first image data about the printed sheet and the second image data based on the reference sheets the same in size and in appearance, thereby facilitating the color measurement in any position on the first and second image data and the color comparison in any position between the first and second image data.

Although the third preferred embodiment is described taking a book including imposed page images as an example, the present invention is applicable to printed matter other than a book insofar as the printed matter includes a combination of different images.

Also in the third preferred embodiment, the method may further comprise Steps S23 to S27 similar to Steps S3 to S7 of the first preferred embodiment, Steps S23 to S27 being performed after Step S13 and before Step S14 as shown in FIG. 7, thereby to determine the positions (objective points) at which the colorimetric values are measured in Step S14. This achieves proper color control of the printed sheets if the reference image (unit image) of the sampled printed sheet differs in size from the reference image data obtained from the reference sheet or if the total misregistration is caused between the first image data and the second image data.

While the invention has been described in detail, the foregoing description is in all aspects illustrative and not restrictive. It is understood that numerous other modifications and variations can be devised without departing from the scope of the invention.

What is claimed is:

1. A printed sheet measurement apparatus for acquiring image data by capturing an image on a printed sheet sampled from a printing apparatus to compute a colorimetric value on said printed sheet based on said image data for ink control in said printing apparatus, said printed sheet measurement apparatus comprising:

a storing element for storing first image data obtained by capturing the image on said printed sheet, and second image data obtained based on reference image data related to an image on a reference printed sheet;

a display element for displaying said first image data and said second image data;

a specifying element for specifying a pair of first points for said first image data displayed on said display element, and specifying a pair of second points for said second image data displayed on said display element, relative positions of the first and second points on displayed images of the first and second image data being equivalent to each other;

a coordinate computing element for associating said first and second image data with each other based on said first and second points to compute a pair of coordinates of a first objective point for one of said first and second image data corresponding to a pair of coordinates of a second objective point for the other of said first and second image data; and a colorimetric value computing element for computing a colorimetric value at each of said first and second objective points corresponding to each other, based on pixel values at said first and second objective points for said first and second image data.

2. The printed sheet measurement apparatus according to claim 1, wherein said second image data stored in said storing element is image data based on prepress data.

3. The printed sheet measurement apparatus according to claim 1, wherein said second image data stored in said storing element is obtained by capturing an image on a previously prepared reference sheet.

4. The printed sheet measurement apparatus according to claim 2, wherein said points specified by said specifying element for each of said first and second image data displayed on said display element are spaced at least a predetermined distance apart from each other.

5. The printed sheet measurement apparatus according to claim 3, wherein said points specified by said specifying element for each of said first and second image data displayed on said display element are spaced at least a predetermined distance apart from each other.

6. The printed sheet measurement apparatus according to claim 2, wherein said specifying element automatically extracts said first and second points in accordance with preset conditions to specify said first and second points.

7. The printed sheet measurement apparatus according to claim 3, wherein said specifying element automatically extracts said first and second points in accordance with preset conditions to specify said first and second points.

8. The printed sheet measurement apparatus according to claim 1, wherein said printed sheet includes a set of copies of said reference image data, said printed sheet measurement apparatus further comprising an image combining element for placing and combining said copies of said reference image data so as to correspond to said first image data to generate said second image data.

9. The printed sheet measurement apparatus according to claim 1, wherein said reference image data includes a plurality of different reference image data, said printed sheet measurement apparatus further comprising another image combining element for imposing and combining said plurality of different reference image data in accordance with a predetermined layout to generate said second image data.

10. The printed sheet measurement apparatus according to claim 8, wherein said image combining element imposes said copies of said reference image data by step-and-repeat imposition in accordance with a predetermined layout to generate said second image data.

11. A method of making a measurement on a printed sheet, comprising the steps of:

a) storing first image data obtained by capturing an image on a printed sheet sampled from a printing apparatus, and second image data obtained based on reference image data related to an image on a reference printed sheet;

b) displaying said first image data and said second image data;

c) specifying a pair of first points for said first image data displayed in said step b), and specifying a pair of second points for said second image data displayed in said step b), relative positions of the first and second points on displayed images of the first and second image data being equivalent to each other;

d) associating said first and second image data with each other based on said first and second points to compute a pair of coordinates of a first objective point for one of said first and second image data corresponding to a pair of coordinates of a second objective point for the other of said first and second image data; and e) computing a colorimetric value at each of said first and second objective points corresponding to each other to be used for ink control in said printing apparatus, based on pixel values at said first and second objective points for said first and second image data.

12. The method according to claim 11, wherein said second image data stored in said step a) is image data based on prepress data.

13. The method according to claim 11, wherein said second image data stored in said step a) is obtained by capturing an image on a previously prepared reference sheet.

14. The method according to claim 12, wherein said points specified in said step c) for each of said first and second image data displayed in said step b) are spaced at least a predetermined distance apart from each other.

15. The method according to claim 13, wherein said points specified in said step c) for each of said first and second image data displayed in said step b) are spaced at least a predetermined distance apart from each other.

16. The method according to claim 12, wherein said step c) comprises the step of automatically extracting said first and second points in accordance with preset conditions to specify said first and second points.

17. The method according to claim 13, wherein said step c) comprises the step of automatically extracting said first and second points in accordance with preset conditions to specify said first and second points.

18. The method according to claim 11, wherein said printed sheet includes a set of copies of said reference image data, said method further comprising the step of f) placing and combining said copies of said reference image data so as to correspond to said first image data to generate said second image data.

19. The method according to claim 11, wherein said reference image data includes a plurality of different reference image data, said method further comprising the step of g) imposing and combining said plurality of different reference image data in accordance with a predetermined layout to generate said second image data.

20. The method according to claim 18, wherein said step f) comprises the step of imposing said copies of said reference image data by step-and-repeat imposition in accordance with a predetermined layout to generate said second image data.

* * * * *